United States Patent [19]

Stone

[11] Patent Number: 5,490,758
[45] Date of Patent: Feb. 13, 1996

[54] PIT-MOUNTED LOAD ELEVATOR

[75] Inventor: Robert M. Stone, Tucson, Ariz.

[73] Assignee: Bishamon Industries Corporation, Ontario, Calif.

[21] Appl. No.: 267,443

[22] Filed: Jun. 28, 1994

Related U.S. Application Data

[63] Continuation-in-part of Ser. No. 14,344, Feb. 5, 1993, abandoned, which is a continuation-in-part of Ser. No. 695,692, May 3, 1991, Pat. No. 5,299,906.

[51] Int. Cl.⁶ .................................................. B65G 57/22
[52] U.S. Cl. .................... 414/792.3; 414/792.2; 414/495
[58] Field of Search ............................ 414/925, 792.2, 414/792.3, 495; 187/269, 273, 205, 206, 216, 401; 211/41, 49.1, 209, 59.3; 254/122, 421; 248/349

[56] References Cited

U.S. PATENT DOCUMENTS

| | | | |
|---|---|---|---|
| 3,174,722 | 3/1965 | Alm | 187/18 X |
| 3,612,300 | 10/1971 | Berghgracht | 414/792.2 |
| 3,702,645 | 11/1972 | Shaw | |
| 4,854,421 | 8/1989 | Kawada | |

FOREIGN PATENT DOCUMENTS

| | | |
|---|---|---|
| 1473991 | 3/1967 | France . |
| 199468 | 6/1978 | Germany . |

*Primary Examiner*—David H. Bollinger
*Attorney, Agent, or Firm*—Antonio R. Durando

[57] ABSTRACT

A self-adjusting pneumatic load elevator is adapted for mounting in a pit so that it can be used with pallet trucks. The elevator has a base, a rotatable, horizontal load platform, a vertically expandable scissors linkage mechanically coupled between the load platform and the base, and an air actuator chamber. To accommodate a rectangular pit opening, the load platform has a circular, rotatable portion surrounded by a rectangular, non-rotatable transition frame which fits with small clearance in the pit opening. An automatic brake prevents the rotation of the load platform when it is flush with the floor, and lightweight, vertically movable skirts on the load platform can strike a worker's toe to warn of danger. To prevent dangerous rebounds, when the elevator fully descends, it automatically releases the air in the air actuator chamber.

21 Claims, 14 Drawing Sheets

PIT-MOUNTED LOAD ELEVATOR

CROSS-REFERENCE TO RELATED APPLICATIONS

This application is a continuation-in-part of U.S. Ser. No. 08/014,344, filed Feb. 5, 1993, entitled "Pit-Mounted Load Elevator," and now abandoned, which is a continuation-in-part of U.S. Ser. No. 07/695,692, filed May 3, 1991, entitled "Self-Adjusting Pneumatic Load Elevator," now issued as U.S. Pat. No. 5,299,906, hereby incorporated by reference.

BACKGROUND OF THE INVENTION

1. Field of the Invention

The present invention relates to load elevators and methods of using them that can maintain the top of a variable load at a convenient predetermined height, and more specifically to a self-adjusting load elevator that can safely be used with pallet trucks.

2. Description of Related Art

In the handling of a number of packages or other objects, a common task is to manually transfer them between an elevated table, or conveyor, etc. and a pallet resting on the floor. While the table or conveyor remains at a fixed height, the top of the load on the pallet, where the next box or object is to be loaded or removed, usually is found at a height that varies as the packages, etc. are piled on or removed from the pallet. This difference in height, and the changes in this difference during loading or unloading of the packages, can be fatiguing and even harmful for a person doing the moving. In my U.S. Pat. No. 5,299,906, I disclosed a captive-air self-adjusting pneumatic load elevator that can be loaded or unloaded incrementally by humans or machinery while maintaining the top of the load at a preferred height above the floor.

Generally loads are put on pallets so that a worker with moving machinery can quickly remove a pallet with a full load from the load elevator, or place a pallet with a full load on it. However, when removing a pallet with a full load from the load elevator, the elevator will automatically rise from its minimum height (about 8 inches) to its maximum height (about 30 inches), a distance typically about 22 inches, with a force comparable to the weight of the load, typically somewhere in the range of 500 to 5,000 lbs. Similarly, the elevator will automatically descend about 22 inches if a full pallet of comparable weight is loaded onto an empty, but pressurized elevator. Therefore, the machinery for transferring a loaded pallet cannot simply slide it horizontally off or on the load elevator: it must first be able to lift or lower the loaded pallet vertically about 22 inches before moving the pallet horizontally. For this reason, expensive lift trucks are typically used to remove or load full pallets on self-adjusting load elevators.

Inexpensive pallet trucks, which can only be adjusted a few inches in height above the floor, cannot safely be used to remove a loaded pallet from such a self-adjusting load elevator. Moreover, the top surface of the pneumatic load elevator described in the above-referenced patent has a minimum height of about 8 inches, which is too high off the floor to accommodate a pallet truck. Thus, to accommodate pallet trucks, such a load elevator might be placed in a pit of depth equal to the elevator's minimum height, so that, when the elevator descends to its minimum height, the top of the load platform of the elevator is flush with the floor. However, before this can be done, a number of problems have to be solved.

For example, the load elevator of U.S. Pat. No. 5,299,906 is fitted with a circular, rotatable load platform so that workers can easily rotate a pallet loaded on it, but the bottom framework that supports the load platform is generally rectangular and therefore will probably be recessed in a rectangular pit. In such case, when the fully loaded elevator descends to be flush with the floor, there will be a dangerous gap in the floor between the rectangular pit opening and the framework for elevator's circular rotatable load platform.

Moreover, if the rotatable load platform on the elevator is instead made generally rectangular to match the rectangular pit opening, any rotation of the rectangular platform by the workers while using the load elevator will misalign the load platform with the pit opening, thus preventing the elevator from descending into the pit.

In addition, a pit-mounted load elevator presents several potential dangers to the workers who use it. For example, if the elevator load platform is rotatable, when it is flush with the floor a worker may inadvertently step on the platform as if it were part of the floor, only to have the platform rotate his foot out from under him. Therefore, there must be found some reliable way to prevent rotation of the load elevator platform when it is flush with the floor.

Also, assuming the elevator load platform is shaped to fit precisely in the opening of the pit, when the platform descends it may strike and seriously injure any portion of the foot of a worker that protrudes over the opening of the pit. Therefore, some reliable means for warning the worker of such danger should be found.

Finally, there is also a danger that, once a loaded pallet is removed off a descended load elevator, the elevator will automatically rebound out of the floor, knocking over the worker. Therefore, some reliable means of disabling an empty, descended elevator from rising automatically needs to be found.

SUMMARY OF THE INVENTION

On objective of this invention is a self-adjusting load elevator that remains at an approximately constant elevation while being loaded, so that access to the top of the loaded platform by workers remains at a convenient elevation during loading.

Another goal of the invention is a load elevator that collapses to ground level under load, thereby becoming easily and safely unloaded or loaded with a pallet truck.

Another objective is a load elevator with a rotatable load platform that is free to rotate while elevated but becomes stationary as the elevator is positioned at ground level for loading or unloading.

Still another goal is a load elevator that comprises a safety device to prevent a user's feet from protruding under the platform and suffering injuries as the elevator is lowered to its ground position.

A final objective is the realization of the above mentioned goals in an economical and commercially viable manner. This is done by utilizing simple components that are either already available commercially or that can be produced competitively during the manufacture of the load elevator.

Therefore, according to these and other objectives, the present invention consists of a self-adjusting load elevator designed for mounting in a pit, so that it can be used with pallet trucks. The elevator has a base, a rotatable, horizontal load platform, a vertically expandable scissors linkage mechanically coupled between the load platform and the base, and an air actuator chamber. For a rectangular pit opening, the load platform has a circular, rotatable plate surrounded by a rectangular, non-rotatable transition frame fitting with a small clearance (such as about 0.5–0.75 inches) in the pit opening. When the elevator extends out of the pit, the rectangular frame is recessed from the rotatable plate. An automatic brake prevents rotation of the circular plate when it is flush with the floor. The rectangular frame is fitted with relatively lightweight, vertically movable skirts (toe guards) which can strike a worker's protruding toe to warn that the platform is descending on his foot. In a second embodiment of the invention, the skirts at all times prevent a worker's feet from protruding into the pit area. To prevent sudden rising of the platform when the load is removed, as the elevator fully descends an exhaust valve automatically releases the air in the air actuator chamber. The invention also includes a method of operating such a load elevator.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose only one of the various ways in which the invention may be practiced.

DETAILED DESCRIPTION OF THE PREFERRED EMBODIMENTS

Figure 1:
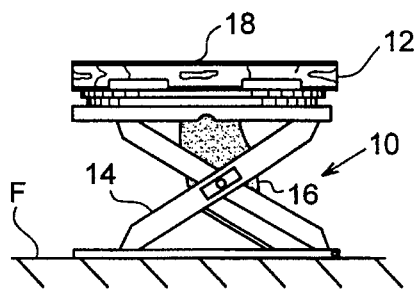
FIG. 1 is a front elevation of a self-height-adjusting load elevator not having the improvement of the invention, when fully extended upward under the minimum load of an empty pallet.

Referring to the figures, wherein like parts are designated throughout by like reference numerals and symbols, a load elevator 10, as disclosed in my U.S. Pat. No. 5,299,906 but not having the improvements of this invention, is shown in FIG. 1. When fully extended upward under the minimum load of an empty pallet 12, it is vertically guided by an expandable scissors linkage 14 maintained vertically by captive pressurized air in an air actuator chamber or bellows 16.

Figure 2:
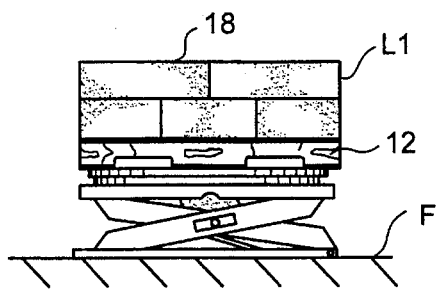
FIG. 2 shows the self-adjusting elevator of FIG. 1 partially compressed by a moderate load on the pallet.

When the load elevator 10 of FIG. 1 is partially compressed by a moderate load L1 on the pallet 12, it appears as in FIG. 2. The weight of the load which compresses the elevator is maintained by captive air in the air actuator chamber, which air has increased in pressure with respect to the configuration of FIG. 1 due to a decrease in the volume of the captive air in the actuation chamber 16 of the system. The air pressure in the air actuator chamber or bellows 16 that drives the scissors mechanism 14 is selected so that, as additional load (boxes) are added to the pallet, the elevator maintains the top 18 of the load at approximately the same convenient height above the floor (typically about 30").

Figure 3:
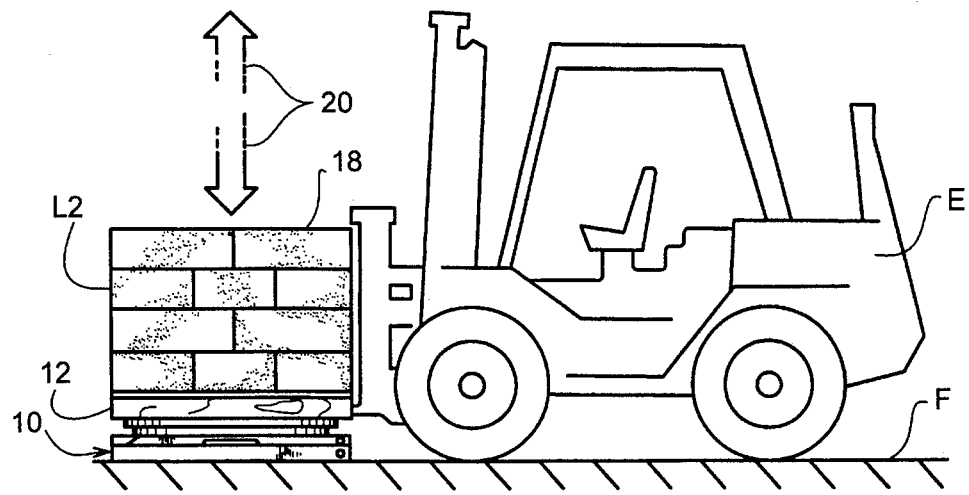
FIG. 3 shows the self-adjusting elevator of FIG. 1 fully compressed by a maximum load on the pallet, together with a lift truck for removing the loaded pallet from the elevator.

When the self-adjusting elevator of FIG. 1 is fully compressed by a maximum load L2 on the pallet, the loaded pallet 12 can be taken off the load elevator 10 as shown in FIG. 3 by suitable moving equipment E. The arrows 20 indicate that, because the elevator 10 automatically rises if the load is removed, a lift truck capable of moving the pallet 12 vertically is required to remove the loaded pallet from the elevator. This maneuver cannot be avoided so long as the system is pressurized.

Figure 4:
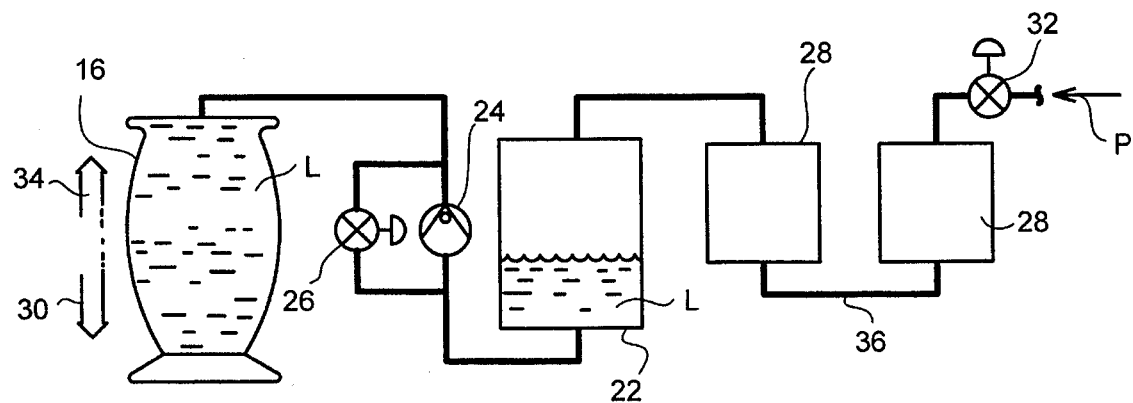
FIG. 4 is a fluid-system diagram of a self-adjusting pneumatic elevator using a non-compressible fluid to prevent the elevator from rising after it has descended under a full load.

As a way to prevent the self-adjusting elevator 10 from rising upon removal of the load L2 and pallet 12 after it has descended all the way under a full load, the elevator pressure system can be modified by the addition of a non-compressible fluid L in the bellows 16, as shown in FIG. 4. In such configuration, the pressure system is fitted with an auxiliary reservoir 22 for holding excess non-compressible fluid L while the bellows 16 is contracted under load, and a check-valve 24 is utilized to regulate the flow between the two so that the non-compressible fluid may flow freely into the auxiliary reservoir 22 but not into the bellows 16. As the bellows 16 is compressed (illustrated by arrow 30 in FIG. 4), the non-compressible fluid in the actuator chamber is pushed through the check-valve 24 and into the auxiliary reservoir 22 against the back pressure of the air (or any other gas utilized by the system) provided by the pressure system through air reservoirs 28. Upon removal of the load from the platform, the check-valve 24 prevents the high pressure in the air system from being transmitted to the bellows 16, thereby allowing it to remain substantially at the elevation corresponding to its compressed state. To restore the pressure in the bellows 16 to raise it for the next load, a normally-closed manual or automated valve 26 is opened, thereby allowing the air pressure P in the system to cause the non-compressible fluid L to flow back into and raise the bellows 16 (as illustrated by arrow 34 in the figure). Another manual or automated valve 32 is also provided to apply air pressure to the system as needed. As explained in my patent referenced above, two air reservoirs 28 in series connected by a small line 36 are preferred to improve the air actuator's performance in maintaining the top of the load at a predetermined working height.

Even with the improvement provided by the combination of a non-compressible fluid with the air system of the invention, commercially-available rubber-walled air pistons or actuators (bellows) that can be used for the elevator of the invention have been found to have enough resilience to spring up four or five inches when the load is removed, which is generally undesirable and at times unacceptable for use with a pallet truck or from a safety viewpoint. Therefore, a better method of preventing the sudden rise of the elevator was yet found by releasing the air pressure between cycles of operation, as disclosed in detail further below.

Figure 5:
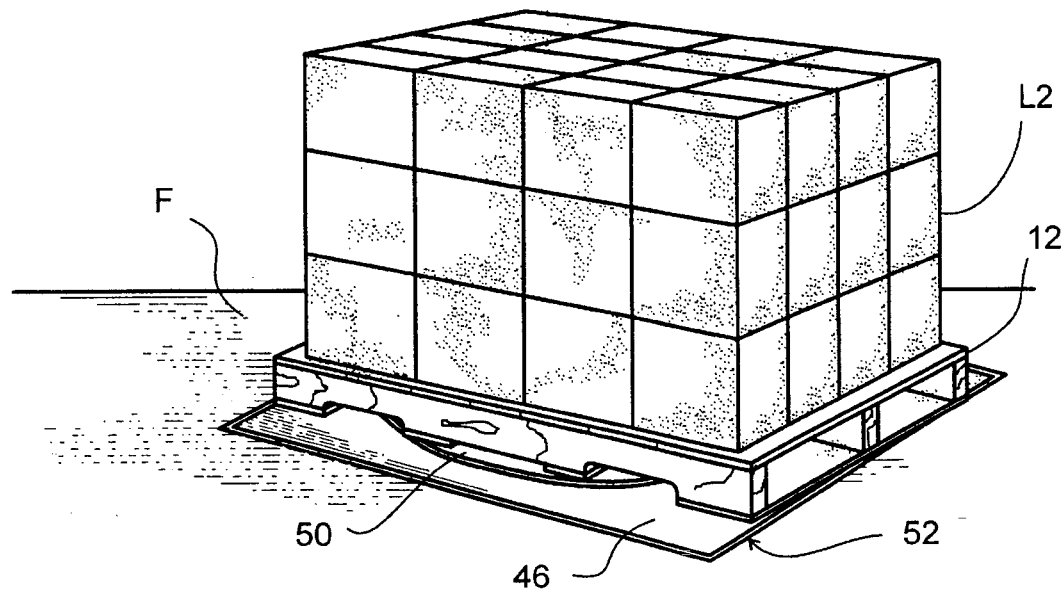
FIG. 5 is a perspective view of a self-adjusting elevator according to the invention when mounted in a rectangular pit and fully compressed by a maximum load on a pallet.
Figure 6:
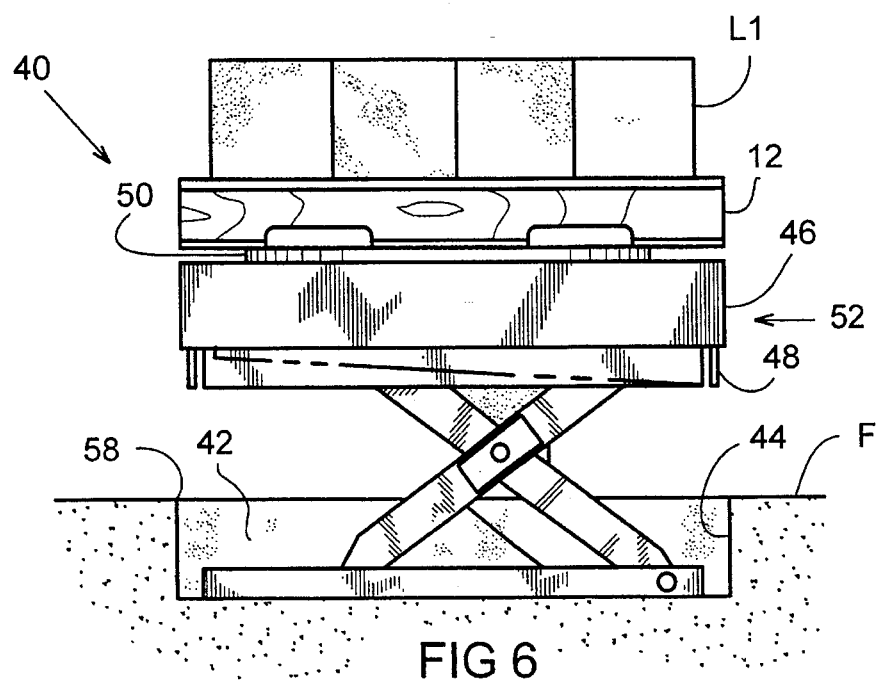
FIG. 6 is a front elevation of the improved elevator of FIG. 5 when only partially compressed by a moderate load on a pallet.
Figure 7:
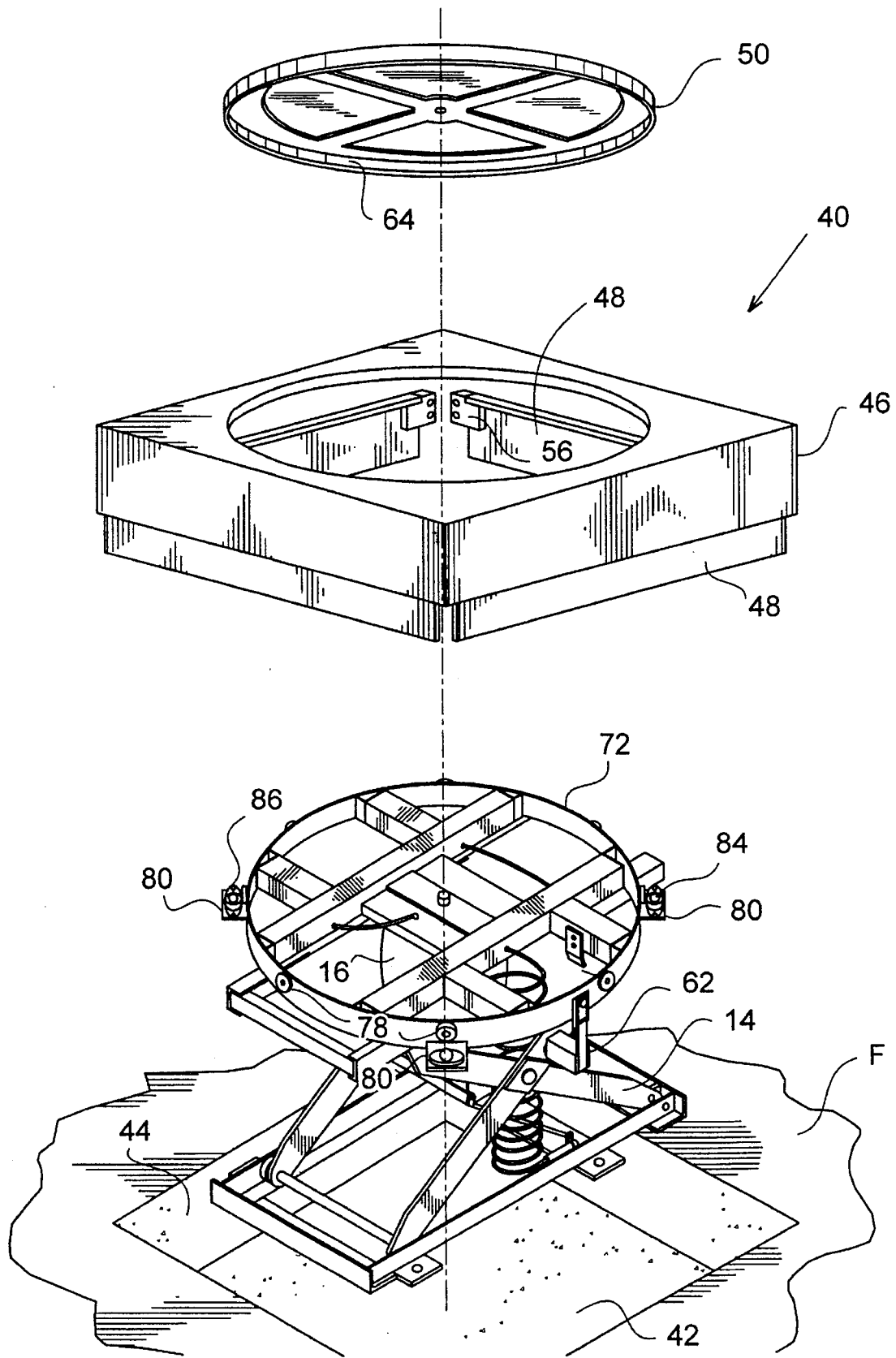
FIG. 7 is an exploded perspective view of the load elevator of FIG. 5.

A first embodiment of a self-adjusting elevator 40 according to the present invention is shown in FIGS. 5-7. As seen in FIGS. 5 and 6, the elevator 40 is adapted to be mounted in a rectangular pit 42 having side walls 44 of a depth equal to the load elevator's minimum height (as seen in FIG. 5, where the elevator 40 is fully compressed by a maximum load L2 on a pallet 12). When so fully compressed, the load L2 becomes flush with the floor F and a non-rotatable rectangular frame 46 occupies the potentially dangerous space between the rectangular edge 58 of the pit 42 and a circular rotatable plate 50 in the load platform 52.

FIG. 6 shows the improved elevator of the invention when only partially compressed by a moderate load L1 on a pallet 12. The load platform 52 extends above the floor and the top of the non-rotatable rectangular frame 46 hangs about ¾ of an inch lower than the circular rotatable plate 50 of the load platform, enabling easy rotation of the loaded pallet without interference from the stationary frame 46.

Figure 8:
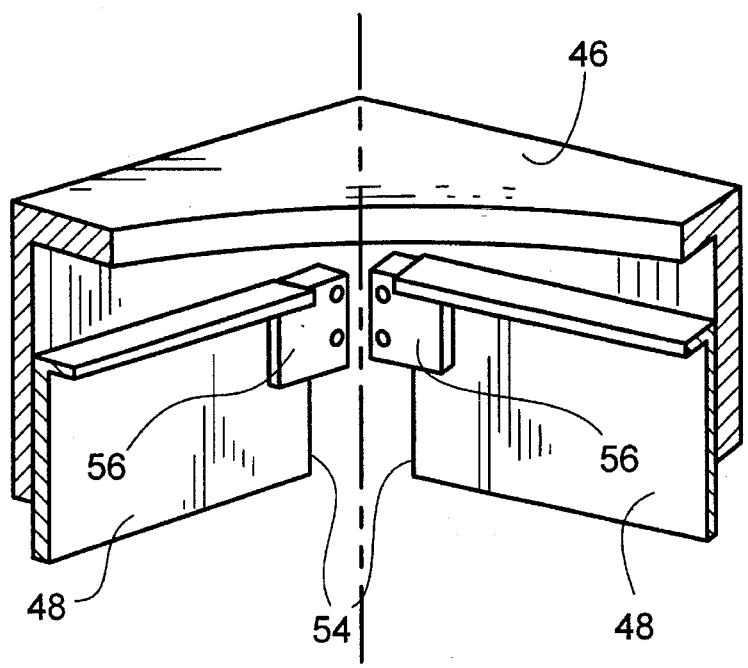
FIG. 8 is a partially-cut out, enlarged view of one corner of the non-rotatable rectangle frame of the load elevator of FIG. 5 showing a safety skirt detail.

FIG. 7 is an exploded view of the elevator 40 of the invention, showing how the non-rotatable rectangular frame 46 and the rotatable plate 50 of the load platform 52 are mounted on the captive air lifting mechanism, typically an air actuator 16 guided by a scissor arrangement 14, as disclosed in my U.S. Pat. No. 5,299,906. As can be seen in the enlarged view of FIG. 8, the non-rotatable rectangle frame 46 of the load elevator 40 is fitted with relatively lightweight, vertically movable skirts 48 (toe guards) which can strike a worker's protruding toe as a warning when the platform approaches ground level under load. The ends 54 of each skirt 48 are slidably mounted on a support anchor 56 bolted in each inside corner of the rectangular frame 46. Each anchor 56 is rigidly attached to the inside of the frame 46 and adapted for slidable vertical connection with the corresponding skirt 48, such that the skirts may move between an upper position approaching the bottom of the frame 46 and a lower position resting on the upper portion of each anchor 56. Thus, the safety skirts 48 protrude downward from the non-rotatable rectangular frame 46 when the load platform 52 is elevated from the pit 42. The frame 46 and the skirts 48 are disposed in close proximity to the side walls 44, preferably leaving only sufficient space therebetween for the platform to be lowered into the pit without scraping of the various parts even under a full load. Thus, as the platform descends toward ground level, any solid object encroaching over the edge of the pit 42 will be struck by the skirts 48, which in turn will slide upward guided by the anchors 56 and provide a user an opportunity for removing the object before serious damage is done. In practice, the skirts 48 serve as a warning to any worker who is inadvertently caught with a foot under the load platform as the elevator descends.

Figure 9:
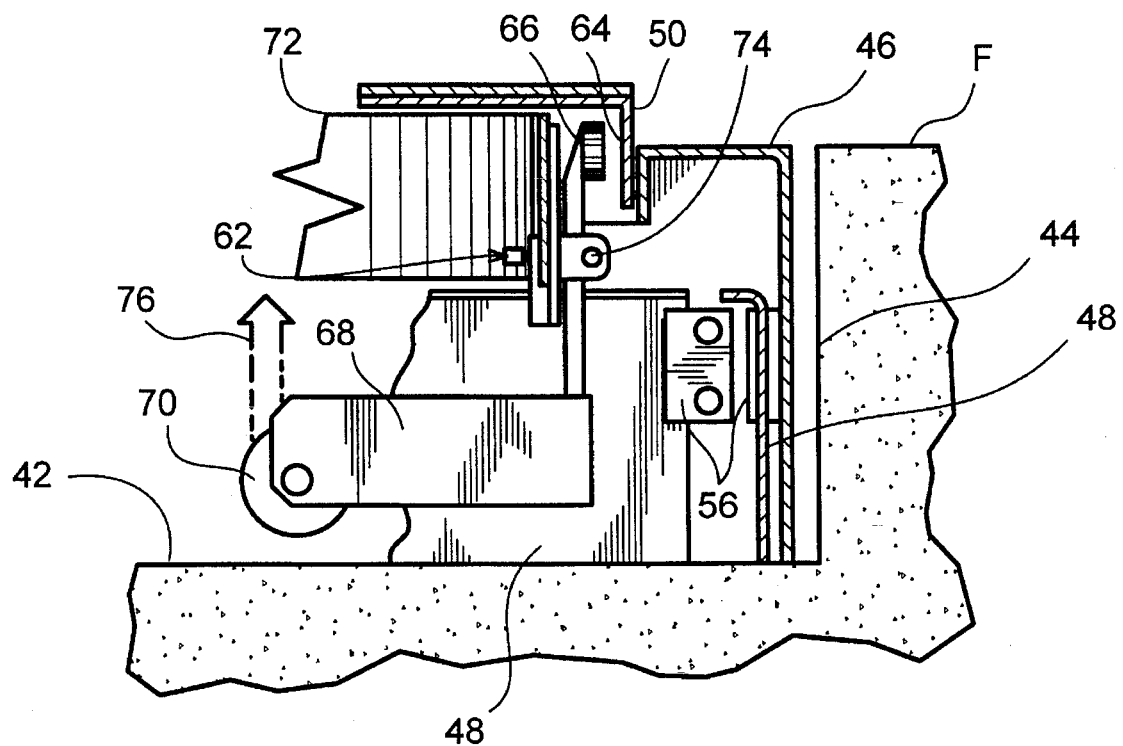
FIG. 9 is a vertical cross-section through an automatic, mechanically-actuated brake mechanism of the load elevator of FIG. 5.

As can be seen best in FIG. 9, to prevent the rotation of the load platform's circular plate 50 when the load elevator is fully descended, the load elevator 40 is also fitted with an automatic brake mechanism 62 which bears on an inner surface 64 of the circular plate 50 (see also FIG. 7). The brake mechanism 62 consists of a substantially-vertical brake pad 66 attached to one end of an L-lever 68 that is fitted with a horizontal roller 70 at the other end. The L-lever 68 is pivotally anchored to a horizontal support ring 72, which is part of the air-actuated elevating structure of the invention (see U.S. Pat. No. 5,299,906), by means of a hinge 74 that causes the brake pad 66 to press against the inner surface 64 of the plate 50 when the load platform approaches ground level during its descent. As the roller 70 contacts the bottom of the pit 42, the L-lever 68 is pushed upward (illustrated by arrow 76) causing the pad 66 to swing outwardly and press against the plate 50, thus preventing any subsequent rotation of the plate. When the load platform is again raised, the weight of the L-lever 68 and roller 70 swing the brake pad 66 inwardly thereby releasing the plate 50 for rotation during use of the elevator in a raised position. A plurality of braking mechanisms 62 is preferably used equally spaced around the support ring 72 for a balanced distribution of the braking forces and a uniform braking action.

Figure 10:
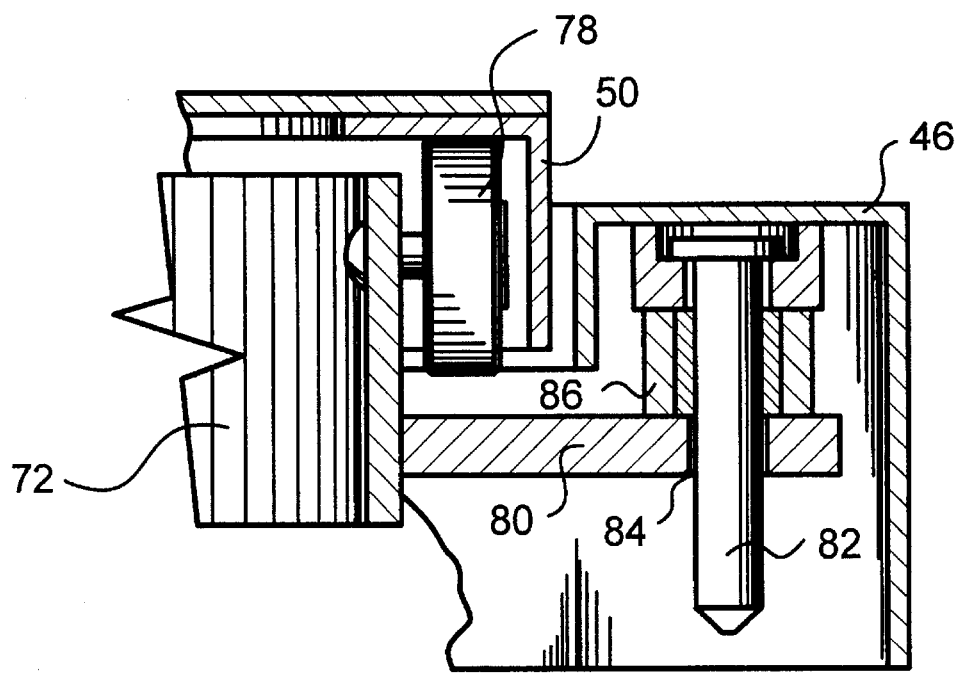
FIG. 10 is a vertical cross-section through one of several roller bearings on the top circular ring of the frame of the load elevator of FIG. 5, wherein the safety skirt is not shown for clarity of illustration.
Figure 11:
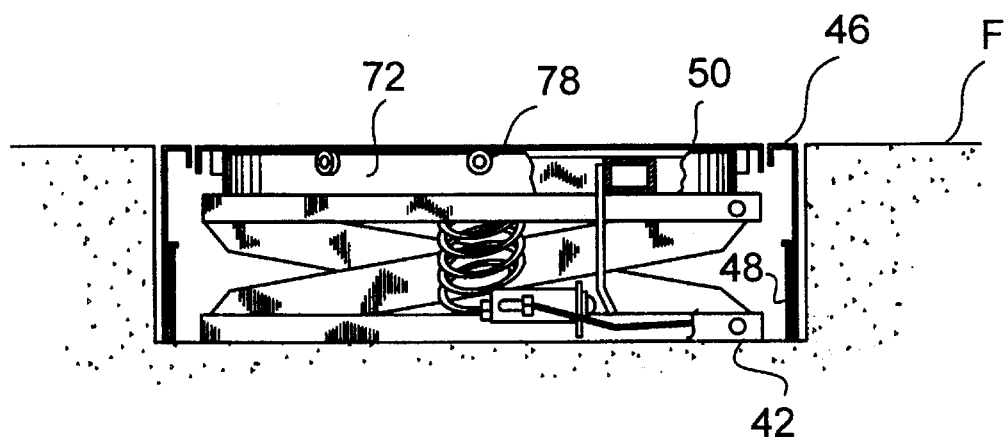
FIG. 11 is a vertical cross-section through the load elevator of FIG. 5 when fully descended into the pit.

When the load platform 52 of the invention is lowered and the air system is purged (as detailed below), the various parts of the platform are so dimensioned that the rectangular frame 46 becomes flush with the floor F and the circular plate 50 in turn becomes flush with the frame and floor. The weight of each component of the load platform (plate 50 and frame 46) forces it down until it rests on a stop appropriately positioned to cause the component to rest at ground level (i.e., flush with the floor). As seen in FIGS. 10 and 11, the plate 50 is rotatably supported by vertical rollers 78 attached to the support ring 72 (as shown in FIG. 7, a plurality of rollers 78 equally spaced around the ring 72 is preferred). Radial arms 80 extend laterally from the support ring 72 to provide a support structure for the rectangular frame 46 during lift. The frame 46 is mounted on the arms 80 by means of vertical guide pins 82 securely attached to the underside of the frame and slidably inserted into guide holes 84 in the arms 80. Sleeves 86 around the guide pins 82 support the frame 46 and determine the height of the frame with respect to the support ring 72 when the load platform is completely lowered. Thus, in operation, the frame 46 is stationarily positioned over the arms 80 when the platform 52 is elevated; on the other hand, as the platform is lowered into the pit 42, the descent of the frame 46 is stopped by the bottom of the pit with the top of the frame in alignment with ground level before the scissors mechanism 14 is fully contracted. Thus, as the support ring 72 continues its descent to a fully lowered position, the radial arms 80 are able to slide downward along the guide pins 82 until the scissors mechanism is fully contracted, at which point the top of the plate 50 is aligned with that of the frame 46 and therefore also with ground level, as illustrated in FIG. 11.

Therefore, when the load elevator is fully lowered into the pit, the rotatable plate 50 is subject to the braking action detailed above and is flush with the rectangular frame and floor surface. This condition prevents the rotation of the plate and minimizes the possibility of any injury caused by accidental loss of balance by a worker stepping upon it.

Figure 12:
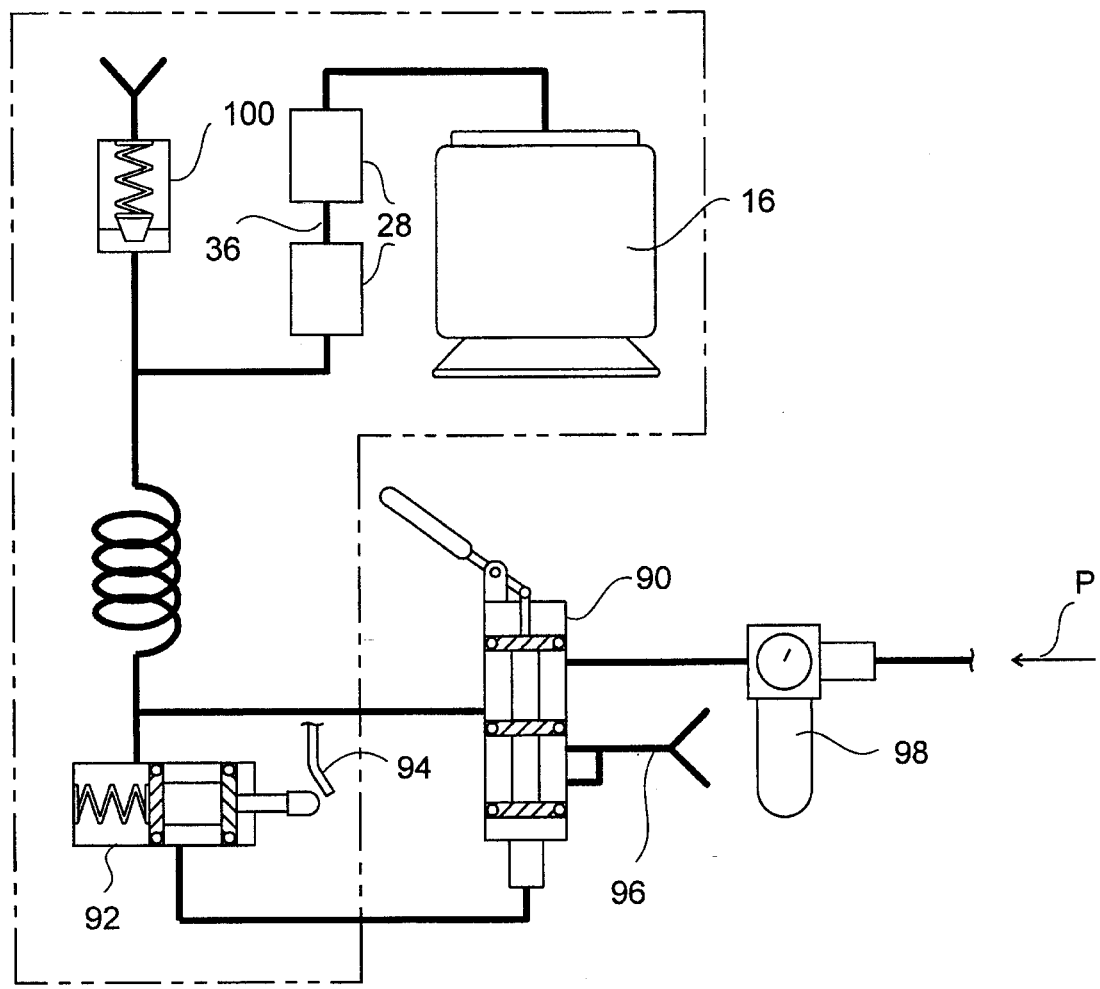
FIG. 12 is a fluid system diagram of the elevator of FIG. 5 for inserting pressurized air into the load elevator's captive air system and automatically releasing the captive air when the elevator fully descends to ground level.

In order to completely eliminate the rise of the load platform 52 when the load is removed from it, an improved air-system diagram for the load elevator 40 of the invention is shown in FIG. 12. A two-position, manually-operable main valve 90 is provided for introducing air (or other gas) under pressure into the load elevator's captive air system in a first valve position and for releasing the air from the system in a second valve position. The main valve 90 is automatically moved to the second, release position when the load elevator is fully lowered by means of a normally-closed pilot valve 92 that is activated open by a downwardly-protruding air-release trigger 94 attached to the top frame 50 of the load elevator. Thus, as the elevator approaches its fully contracted position, the main valve 90 automatically evacuates the system air through a vent 96 and all pressure in the bellows is released, thus eliminating all upward forces produced thereby. In the next cycle of operation, the main valve 90 is manually switched to a source of high-pressure air P and the system is again pressurized to provide the self-adjusting properties of a load elevator according to the invention. A pressure gauge 98 and a relief valve 100 are also in the system for control and safety purposes, as one skilled in the art understands.

Figure 13:
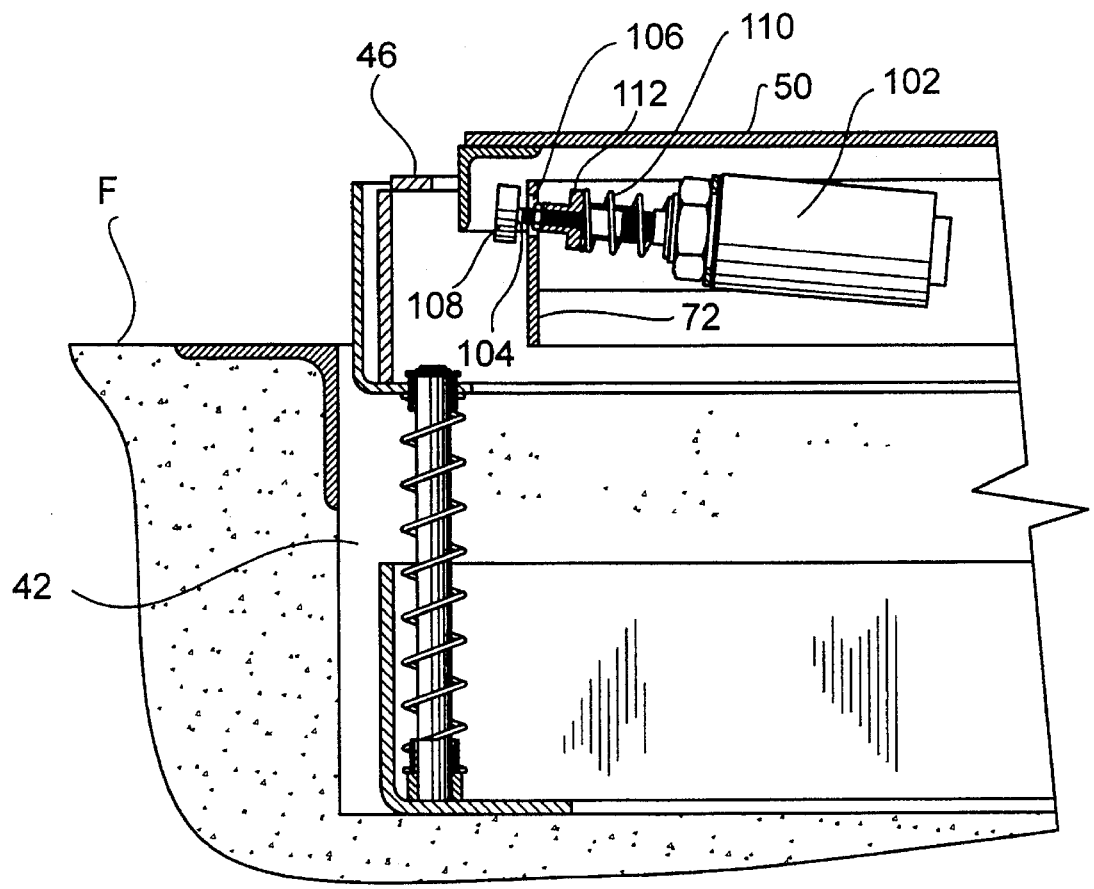
FIGS. 13 and 14 are vertical cross-sections showing another embodiment of an automatic, pneumatically-actuated brake mechanism for the load elevator of FIG. 5 in released and braked condition, respectively.
Figure 14:
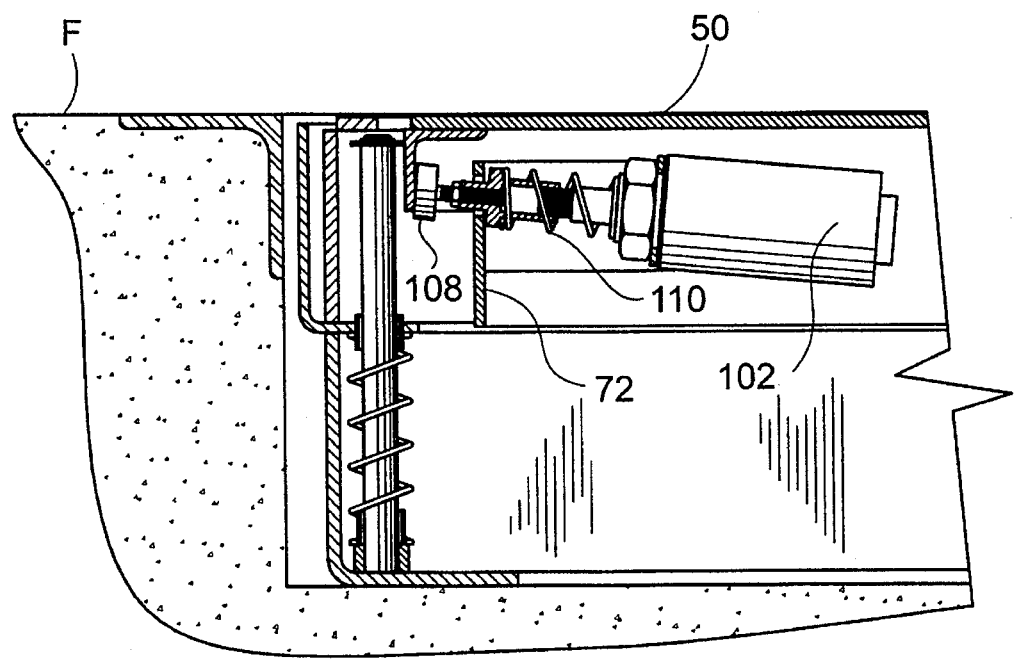
Figure 15:
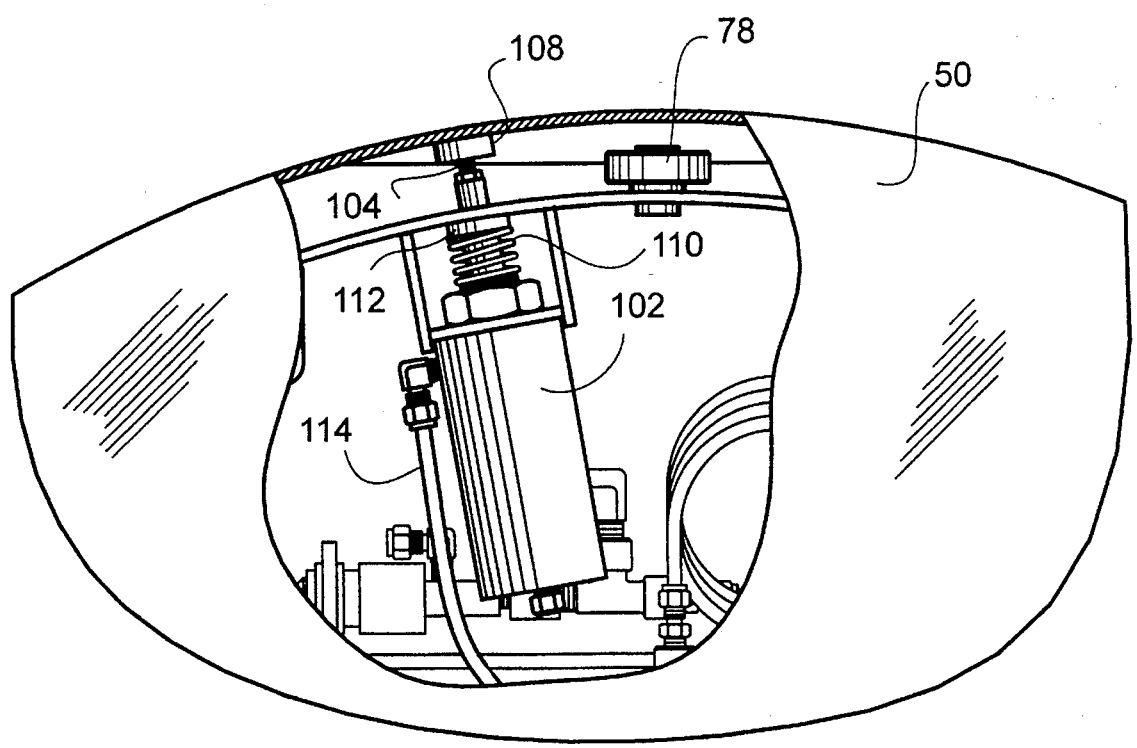
FIG. 15 is a top view of the brake mechanism of FIGS. 13 and 14 as seen through a partially cut-out section of the rotatable plate of the load elevator.

In another embodiment of the invention, the brake system for the rotatable plate 50 is tied to the pressurized pneumatic circuit of the elevator so as to automatically activate the brake then the load platform reaches its bottom position. As illustrated in FIGS. 13–15, this alternative brake mechanism consists of a pneumatic cylinder 102 fixedly attached inside the support ring 72 and disposed with a shaft 104 protruding radially through an opening 106 in the ring. A brake pad 108 is attached to the tip of the shaft 104 and adapted to press against the inner side 64 of the rotatable plate 50 as the shaft extends radially. The shaft 104 is biased toward its extended position by a spring 110 pushing against a retaining collar 112 and is kept in its retracted position by air pressure in the cylinder 102. Thus, when the air system of the load elevator is pressurized (that is, when the load platform is elevated), the brake pad 108 is retracted and the plate 50 is free to rotate. As illustrated in FIG. 14, when the air is released from the system as the platform approaches ground level (see the automatic action of the release trigger 94 in FIG. 12), the spring-loaded shaft 104 pushes outwardly against the retaining collar 112, which slides through the opening 106 and causes the brake pad 108 to contact the plate 50 and block its further motion.

FIG. 15 is a top view of one of the brake mechanisms just described through the partially cut-out plate 50 of the load elevator of the invention. This figure details the configuration of the brake mechanism within the air system of the invention, showing an air-pressure line 114 disposed so as to retract the shaft 104 against the force exerted by the spring 110 when the system is pressurized.

Figure 16:
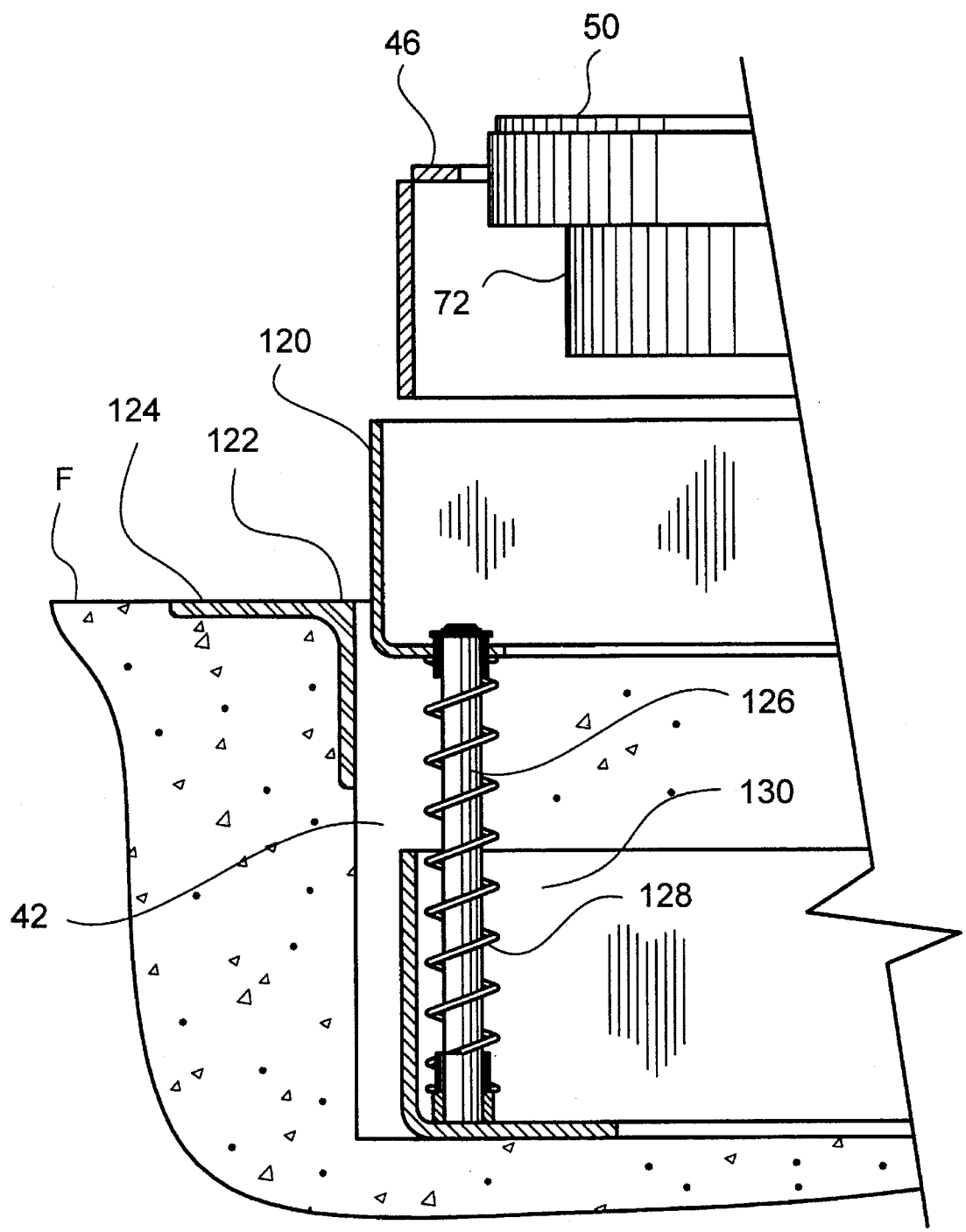
FIGS. 16–18 are vertical cross-sections showing another embodiment of a spring-loaded safety skirt adapted to emerge around the perimeter of the pit containing the elevator of the invention as the load platform is raised; the figures show three different stages along the motion of the platform.
Figure 17:
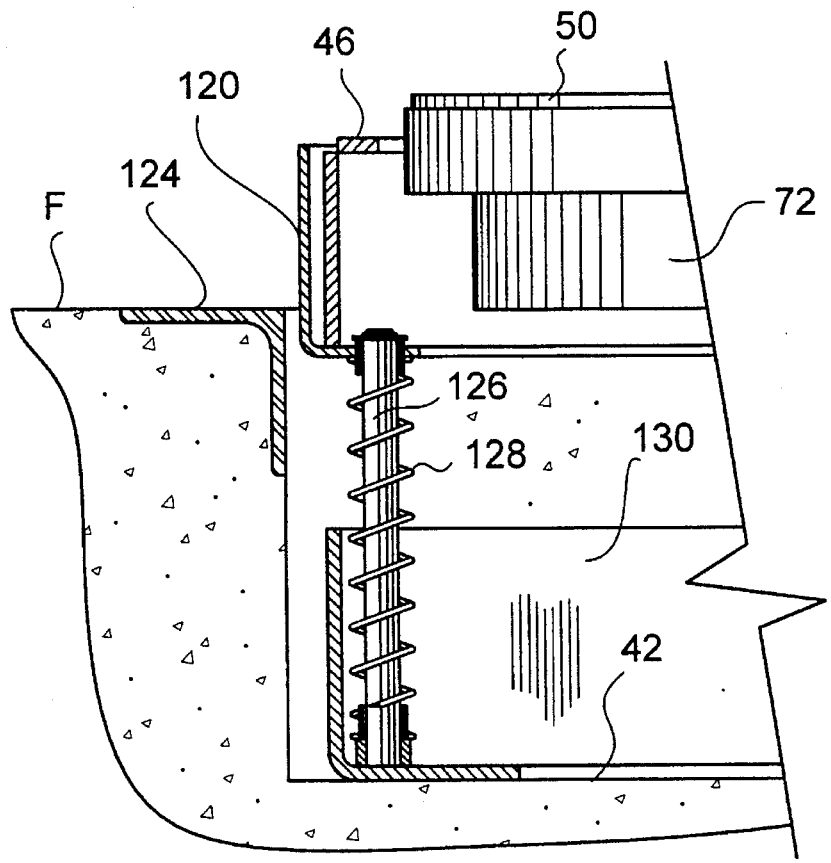
Figure 18:
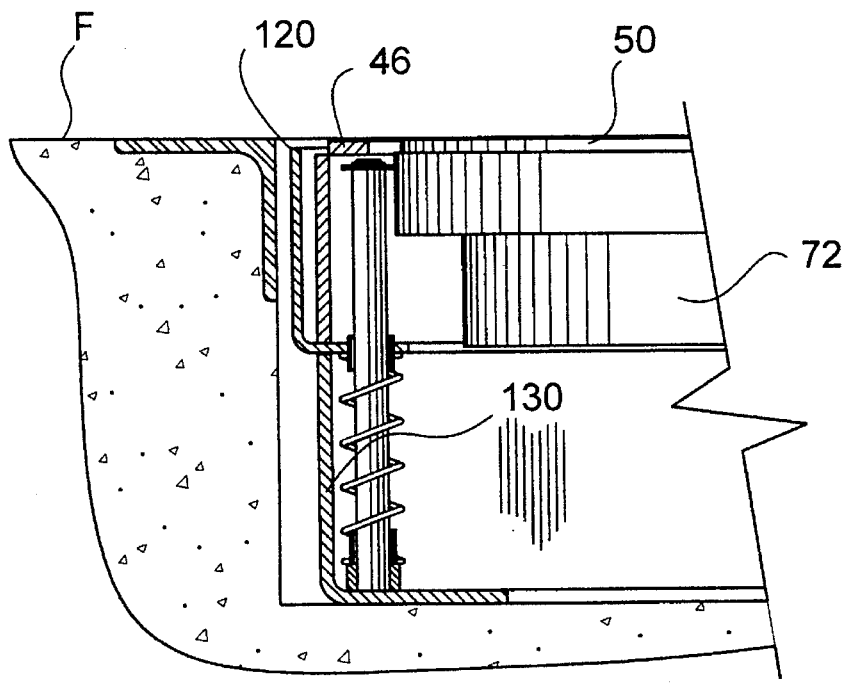

In yet another embodiment shown in FIGS. 13–15 but particularly illustrated in FIGS. 16–18, the safety skirts of the invention are mounted on the bottom of the load elevator, rather than on the frame 46 of the load platform. In order to avoid the inconvenience that may occur when the skirts 48 of the embodiment of FIG. 7 strike an object placed thereunder during the descent of the platform, the embodiment of FIGS. 16–18 shows skirts 120 that emerge along the perimeter of the pit 42 as the load elevator rises, thus preventing any object from protruding over the edge 122 of the pit (shown covered by a curb-angle structure 124 in the figures). The skirts 120 are slidably mounted on vertical posts 126 and supported by springs 128 of sufficient length and strength to raise the top of each skirt (or skirt unit, if all skirts are fastened together to form a single perimeter toe guard) above ground level, as shown in FIG. 16, when the load platform is elevated. When the platform is lowered, each side of the frame 46 is adapted for sliding closely inside the corresponding skirt 120 and connecting with the bottom thereof to push it downward against the action of the springs 128 (see FIG. 17). As the descent of the load platform continues, the weight of the load platform assembly compresses the springs 128 and causes the skirts 120 to retract completely into the pit 42. As illustrated in FIG. 18, the descending motion of the elevator is stopped at ground level by a retaining structure 130 vertically aligned with the frame 46 through the bottom of the skirts 120, or with another suitable structure, to ensure that a flat surface flush with the ground results when the plate and frame are completely lowered.

Figure 19:
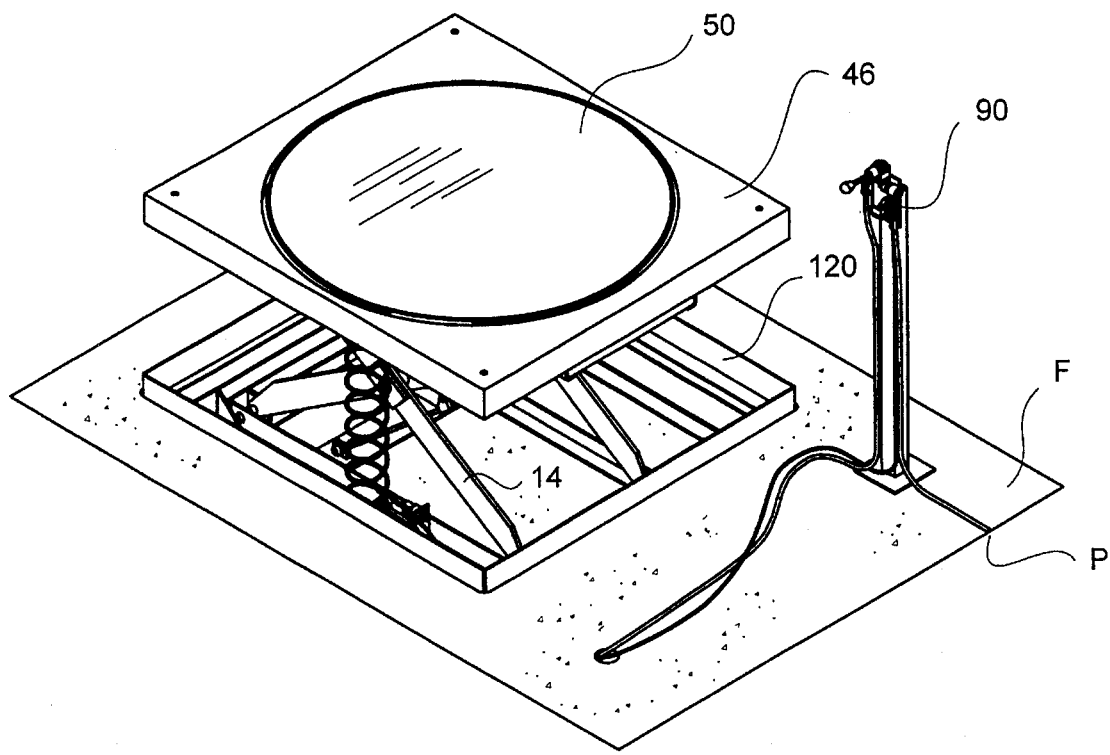
FIG. 19 is a perspective illustration of the embodiment of FIGS. 12 and 16–18, shown installed in a receiving pit and in elevated position.
Figure 20:
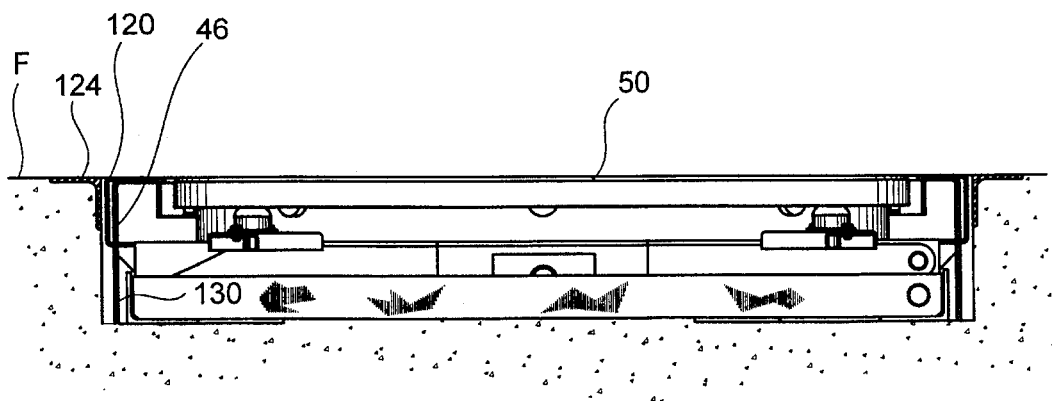
FIG. 20 is a cross-sectional view of a pit housing the elevator of the invention in fully lowered condition, illustrating the flush configuration of the rotatable plate and stationary frame with ground level.
Figure 21C:
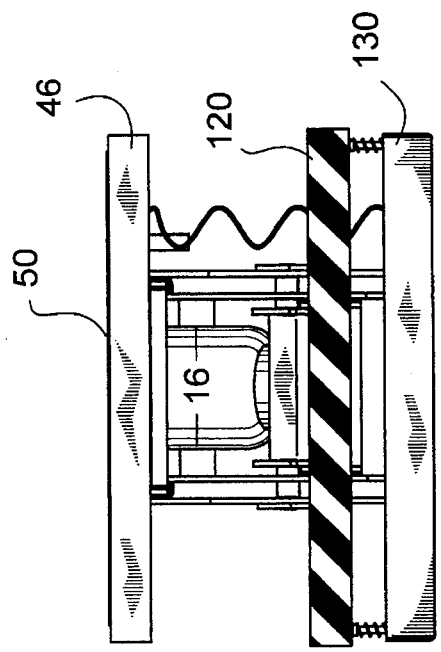
FIGS. 21A, 21B and 21C illustrate the major mechanical components of the latter embodiment of the invention in top, front, and side views, respectively.
Figure 21A:
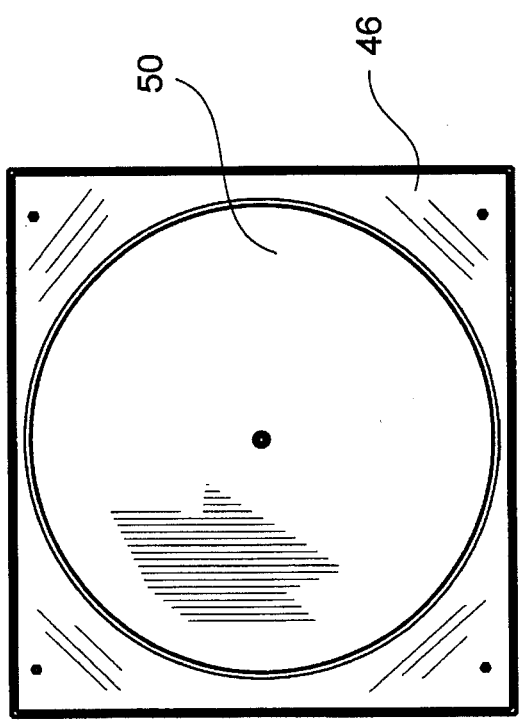
Figure 21B:
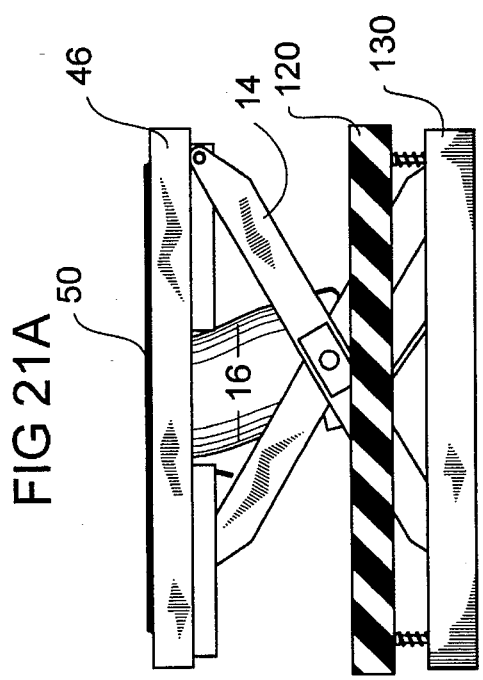
Figure 22A:
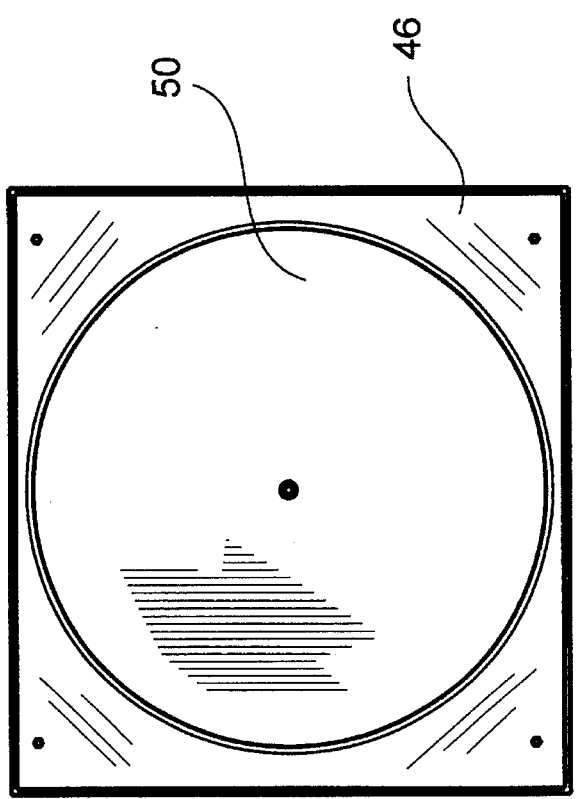
FIGS. 22A, 22B and 22C illustrate the major mechanical components of the latter embodiment of the invention in top, front, and side views, respectively, as seen after installation in a receiving pit.
Figure 22B:
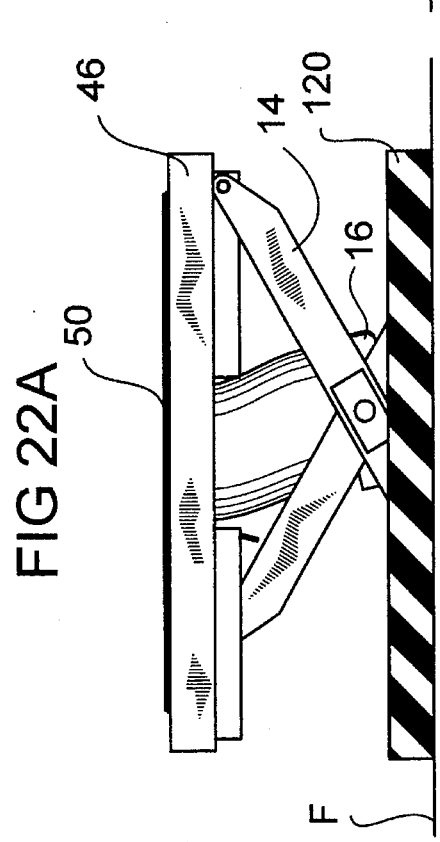
Figure 22C:
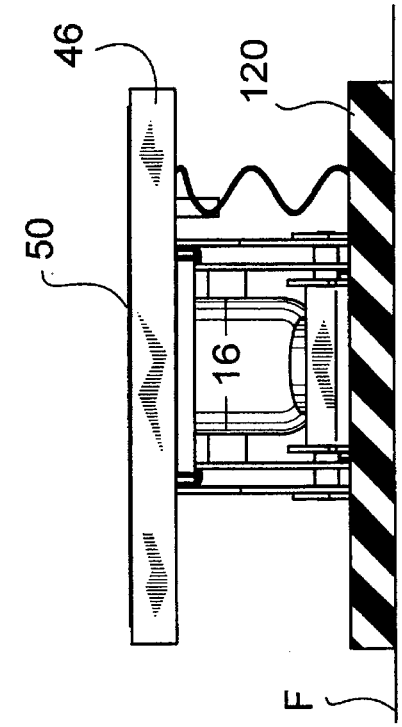

FIGS. 19 and 20 illustrate this embodiment of the invention showing the elevator in raised and in lowered positions, respectively. FIGS. 21A, 21B and 21C represent top, front and side views, respectively, of this embodiment of the invention as seen before installation in a pit. The safety skirts 120 are illustrated in black and yellow stripes, as required by industrial regulations. FIGS. 22A, 22B and 22C represent top, front and side views, respectively, of the same embodiment after installation in a pit.

Figure 23:
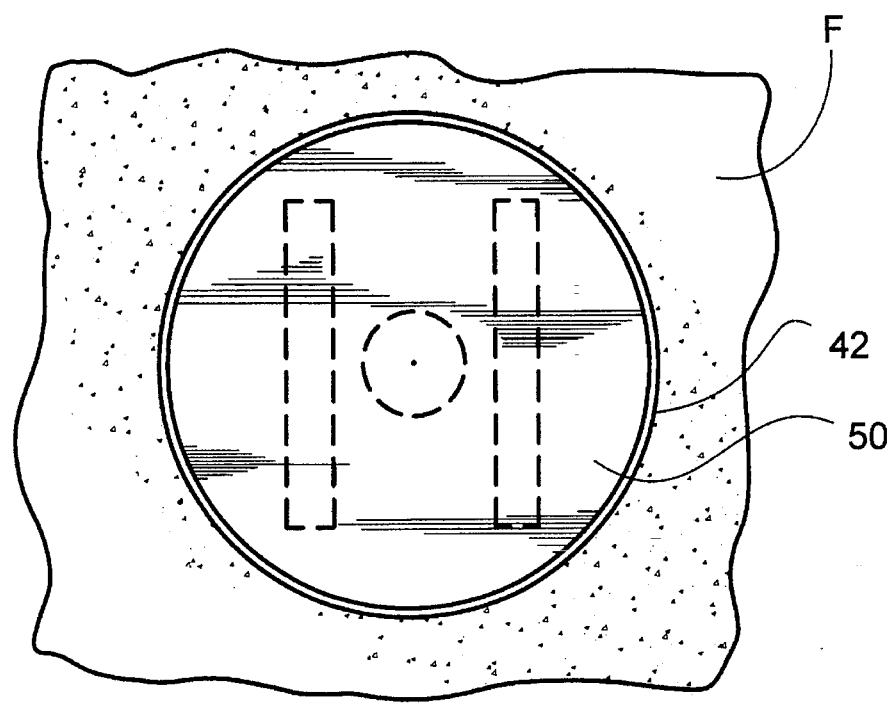
FIG. 23 is a top plan view of another embodiment of the load elevator of the invention for a pit with a circular opening.
Figure 24:
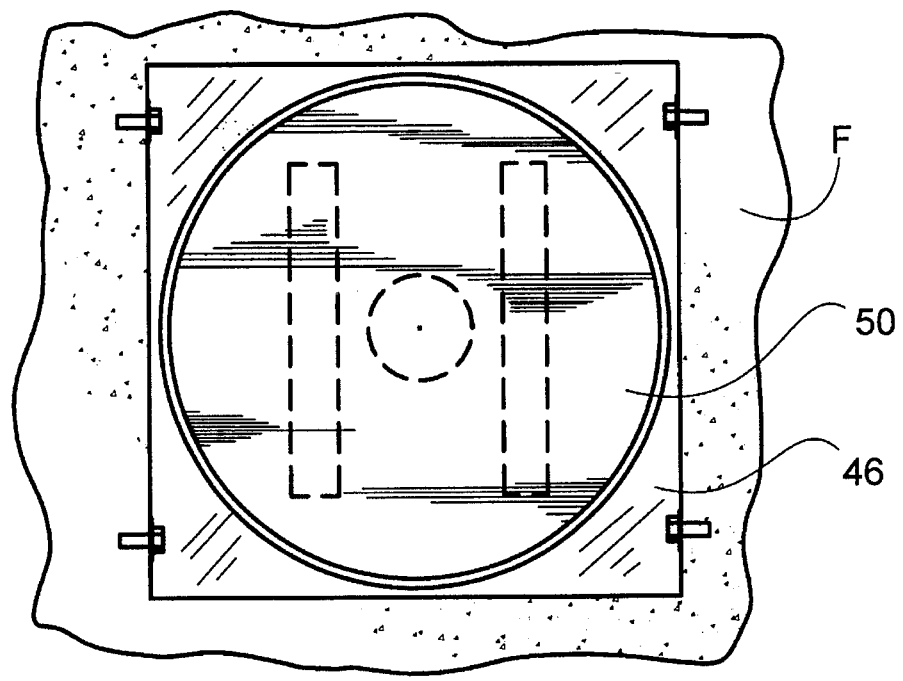
FIG. 24 is a top plan view of yet another embodiment of the load elevator of the invention for mounting in a pit having a rectangular opening with a stationary frame bolted thereto.

A similar embodiment of the load elevator of the invention suitable for mounting in a pit with a circular opening is shown in top view FIG. 23. A top rotatable plate 50 of the load platform large enough in radius to cover the entire elevator mechanism is used instead of the rotatable-plate/stationary-frame combination described above. Finally, another embodiment of an inventive load elevator suitable for mounting in a pit with a rectangular opening is also shown in FIG. 24. This elevator is similar to the preferred embodiment disclosed herein but includes a rectangular frame 46 that is bolted to the side walls of the pit, so that it remains vertically stationary during use.

While the present invention is described with reference to particular embodiments, those skilled in the art will recognize that many variations and geometries may be employed without departing from the spirit and scope of the invention as set forth in the claims. Similarly, while air is an inexpensive and convenient fluid for the system, there may be applications where, with suitable adjustments of the components, a gas other than air can be used, or even a non-gas fluid used in place of air.

I claim:

1. A self-adjusting load elevator for mounting in a pit in a floor, comprising:
   a base, a rotatable load platform, and a vertically expandable scissors linkage mechanically coupled between the load platform and the base;
   a fluid actuator chamber mechanically coupled to said scissors linkage and adapted to actuate the scissors linkage, said actuator chamber being expandable and contractible;
   an isobaric fluid system fluidly coupled to said actuator chamber to provide a fluid to the actuator chamber when it expands and to receive back fluid therefrom when it contracts, said fluid system comprising a fluid reservoir and a fluid source coupled thereto;
   a fluid inlet/outlet valve fluidly coupled to the fluid system to control a pressure thereof; and
   means for preventing a rotation of the load platform when it is approximately flush with the floor.

2. The self-adjusting load elevator of claim 1, wherein said rotatable load platform consists of a circular plate mounted on a plurality of roller bearings; and wherein said means for preventing a rotation of the load platform when it is approximately flush with the floor consists of a brake mechanism that bears on said circular plate.

3. The self-adjusting load elevator of claim 2, wherein said brake mechanism consists of a brake pad attached to a first end of a lever pivotally mounted on a support structure for said load platform, such that the brake pad bears on said circular plate when a second end of the lever bears on a surface disposed at an elevation corresponding to a fully descended position of the elevator.

4. The self-adjusting load elevator of claim 2, wherein said brake mechanism consists of a brake pad attached to a shaft of a cylinder connected to and pressurized by said fluid system and adapted to bear on said circular plate when said pressure is released from the fluid system.

5. The self-adjusting load elevator of claim 1, further comprising a non-rotatable frame mounted around said rotatable load platform and adapted to fit within said pit and become flush with the rotatable load platform and the floor when the load elevator is fully descended.

6. The self-adjusting load elevator of claim 5, further comprising a vertically-movable skirt disposed around said non-rotatable frame and adapted to strike an object protruding within the pit in the floor as the elevator's load platform approaches the floor.

7. The self-adjusting load elevator of claim 6, wherein said brake mechanism consists of a brake pad attached to a first end of a lever pivotally mounted on a support structure for said load platform, such that the brake pad bears on said circular plate when a second end of the lever bears on a surface disposed at an elevation corresponding to a fully descended position of the elevator.

8. The self-adjusting load elevator of claim 6, wherein said brake mechanism consists of a brake pad attached to a shaft of a cylinder connected to and pressurized by said fluid system and adapted to bear on said circular plate when said pressure is released from the fluid system.

9. The self-adjusting load elevator of claim 5, wherein said brake mechanism consists of a brake pad attached to a first end of a lever pivotally mounted on a support structure for said load platform, such that the brake pad bears on said circular plate when a second end of the lever bears on a surface disposed at an elevation corresponding to a fully descended position of the elevator.

10. The self-adjusting load elevator of claim 5, wherein said brake mechanism consists of a brake pad attached to a shaft of a cylinder connected to and pressurized by said fluid system and adapted to bear on said circular plate when said pressure is released from the fluid system.

11. The self-adjusting load elevator of claim 5, further comprising a vertically-movable skirt disposed around said pit and adapted to emerge therefrom to prevent an object from protruding within the pit in the floor when the load platform is elevated from the floor.

12. The self-adjusting load elevator of claim 11, wherein said brake mechanism consists of a brake pad attached to a first end of a lever pivotally mounted on a support structure for said load platform, such that the brake pad bears on said circular plate when a second end of the lever bears on a surface disposed at an elevation corresponding to a fully descended position of the elevator.

13. The self-adjusting load elevator of claim 11, wherein said brake mechanism consists of a brake pad attached to a shaft of a cylinder connected to and pressurized by said fluid system and adapted to bear on said circular plate when said pressure is released from the fluid system.

14. The self-adjusting load elevator of claim 1, further comprising a vertically-movable skirt disposed around said pit and adapted to emerge therefrom to prevent an object from protruding within the pit in the floor when the load platform is elevated from the floor.

15. The self-adjusting load elevator recited in claim 1, wherein said elevator is mounted in a pit in a floor; and wherein said load platform is rotatable and said elevator further comprises means for preventing a rotation of the load platform when it is approximately flush with the floor.

16. The self-adjusting load elevator of claim 15, further comprising a non-rotatable frame mounted around said rotatable load platform and adapted to fit within said pit and become flush with the rotatable load platform and the floor when the load elevator is fully descended.

17. The self-adjusting load elevator of claim 15, wherein said rotatable load platform consists of a circular plate mounted on a plurality of roller bearings; and wherein said means for preventing a rotation of the load platform when it is approximately flush with the floor consists of a brake mechanism that bears on said circular plate.

18. The self-adjusting load elevator of claim 17, further comprising a vertically-movable skirt disposed around said non-rotatable frame and adapted to strike an object protruding within the pit in the floor as the elevator's load platform approaches the floor.

19. The self-adjusting load elevator of claim 17, further comprising a vertically-movable skirt disposed around said pit and adapted to emerge therefrom to prevent an object from protruding within the pit in the floor when the load platform is elevated from the floor.

20. A self-adjusting load elevator comprising:

(a) a base;

(b) a load platform;

(c) a vertically expandable scissors linkage mechanically coupled between the load platform and the base;

(d) an actuator chamber comprising a compressible bellows mechanically coupled to said scissors linkage and adapted to actuate the scissors linkage, said bellows being hydraulically connected through a check valve to a liquid-fluid reservoir of sufficient capacity to receive back liquid fluid from the bellows when the bellows contracts, said bellows and liquid-fluid reservoir also being connected through a second valve adapted to provide liquid fluid to the bellows when the bellows expands;

a gaseous-fluid reservoir of fixed volume isobarically fluidly coupled to said liquid-fluid reservoir to provide gaseous fluid to the liquid-fluid reservoir when the bellows expands and to receive back gaseous fluid from the liquid-fluid reservoir when the bellows contracts, whereby said liquid-fluid reservoir and said gaseous-fluid reservoir have substantially the same pressure at all times; and (e) an inlet/outlet valve coupled to said gaseous fluid reservoir.

21. In a self-adjusting load elevator apparatus comprising a load platform vertically moved by an expandable bellows fluidly coupled to a pressurized fluid actuator chamber, the improvement consisting of:

a liquid-fluid reservoir hydraulically connected to said bellows through a check valve, said liquid-fluid reservoir being of sufficient capacity to receive back liquid fluid from the bellows when the bellows contracts, said bellows and liquid-fluid reservoir also being connected through a second valve adapted to provide liquid fluid to the bellows when the bellows expands; and a gaseous-fluid reservoir isobarically fluidly coupled to said liquid-fluid reservoir to provide gaseous fluid to the liquid-fluid reservoir when the bellows expands and to receive back gaseous fluid from the liquid-fluid reservoir when the bellows contracts, whereby said liquid-fluid reservoir and said gaseous-fluid reservoir have substantially the same pressure at all times.

* * * * *